US006874027B1

(12) United States Patent
English

(10) Patent No.: US 6,874,027 B1
(45) Date of Patent: Mar. 29, 2005

(54) LOW-OVERHEAD THREADS IN A HIGH-CONCURRENCY SYSTEM

(75) Inventor: Robert M. English, Menlo Park, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 516 days.

(21) Appl. No.: 09/590,491

(22) Filed: Jun. 9, 2000

Related U.S. Application Data

(60) Provisional application No. 60/195,732, filed on Apr. 7, 2000.

(51) Int. Cl.$^7$ .............................................. G06F 15/173
(52) U.S. Cl. ........................ 709/226; 709/201; 718/102
(58) Field of Search .................... 709/226, 201, 709/107, 108, 205, 102, 104, 203; 718/102, 100, 106, 104, 107, 105, 101; 707/8

(56) References Cited

U.S. PATENT DOCUMENTS

| 4,459,664 | A | | 7/1984 | Pottier et al. | |
|---|---|---|---|---|---|
| 4,742,447 | A | | 5/1988 | Duvall et al. | |
| 4,937,763 | A | | 6/1990 | Mott | 364/550 |
| 5,067,099 | A | | 11/1991 | McCown et al. | 364/550 |
| 5,596,579 | A | * | 1/1997 | Yasrebi | 719/328 |
| 5,812,844 | A | * | 9/1998 | Jones et al. | 709/104 |
| 5,835,763 | A | * | 11/1998 | Klein | 718/101 |
| 5,903,752 | A | * | 5/1999 | Dingwall et al. | 709/103 |
| 5,913,051 | A | * | 6/1999 | Leeke | 703/23 |
| 6,205,414 | B1 | * | 3/2001 | Forsman et al. | 703/26 |
| 6,272,518 | B1 | * | 8/2001 | Blazo et al. | 718/102 |

(Continued)

FOREIGN PATENT DOCUMENTS

EP 0537098 4/1993

OTHER PUBLICATIONS

David R. Cheriton, "Multi–Process Structuring and the Thoth Operating System". Department of Computer Science, University of British Columbia, Vancouver, B.C. Canada. Mar. 1979. pp. 1–64.

David R. Cheriton, "The Thoth System: Multi–Process Structuring and Portability". The Computer Science Library.

David R. Cheriton et al., "Thoth, A Portable Real–Time Operating System". Communication of the ACM. Feb. 1979.vol. 22. No. 2. pp. 105–115.

David Hitz et al., "Using UNIX as One Component of a Lightweight Distributed Kernel for Multiprocessor File Servers". Technical report 5. Jan. 1990. Auspex.

Jonesk. Anita, "StarOS, a Multiprocessor Operating System for the Support of Task Forces". Department of Computer Science. Carnegie–Mellon University. Pittsburg, PA. 1979.

(Continued)

Primary Examiner—Ario Etienne
Assistant Examiner—Abdullahi E. Salad
(74) Attorney, Agent, or Firm—Swernofsky Law Group PC

(57) ABSTRACT

A method and system for providing the functionality of dynamically-allocated threads in a multithreaded system, in which the operating system provides only statically-allocated threads. With this functionality, a relatively large number of threads can be maintained without a relatively large amount of overhead (either in memory or processor time), and it remains possible to produce program code without undue complexity. A plurality of dynamically-allocated threads are simulated using a single statically-allocated thread, but with state information regarding each dynamically-allocated thread maintained within the single statically-allocated thread. The single statically-allocated thread includes, for each procedure call that would otherwise introduce a new simulated thread, a memory block including (1) a relatively small procedure call stack for the new simulated thread, and (2) a relatively small collection of local variables and other state information for the new simulated thread.

23 Claims, 2 Drawing Sheets

U.S. PATENT DOCUMENTS

| | | | | |
|---|---|---|---|---|
| 6,317,844 B1 | * | 11/2001 | Kleiman | 714/6 |
| 6,324,492 B1 | * | 11/2001 | Rowe | 703/13 |
| 6,389,446 B1 | * | 5/2002 | Torii | 709/100 |
| 6,427,161 B1 | * | 7/2002 | LiVecchi | 709/102 |
| 6,496,942 B1 | * | 12/2002 | Schoenthal et al. | 714/4 |
| 6,505,229 B1 | * | 1/2003 | Turner et al. | 709/107 |
| 6,505,250 B2 | * | 1/2003 | Freund et al. | 709/226 |
| 6,535,878 B1 | * | 3/2003 | Guedalia et al. | 707/8 |
| 6,542,920 B1 | * | 4/2003 | Belkin et al. | 709/104 |
| 6,687,729 B1 | * | 2/2004 | Sievert et al. | 718/102 |

OTHER PUBLICATIONS

Michael A. Malcolm, "A Process Abstraction and its Application". Department of Computer Science. University of Waterloo. Waterloo, Ontario.Proc. Eighth Manitoba Conference on Numerical Math. And Computing, 1978.

Network Appliance–Data ONTAP Event Management System, Aug. 10, 2000.

Silberschatz et al., "Operating System Concepts". 1989.

VRTX. Versatile Real–Time Executive for Microprocessors. C User's Guide. Jan. 1987.

Lantz, Keith A. Et al., "Rochester's Intelligent Gateway". IEEE. Oct. 1982.

* cited by examiner

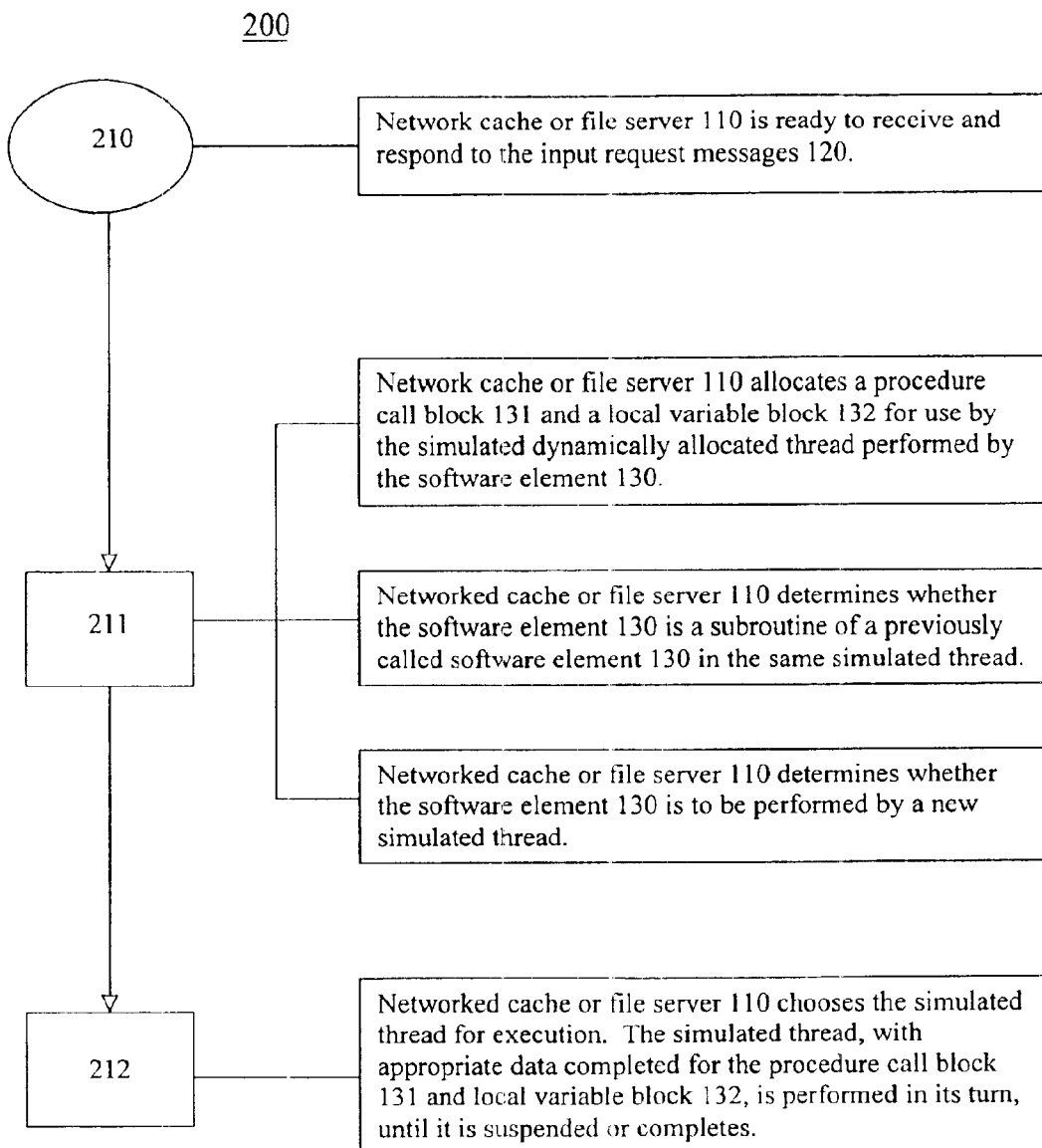

LOW-OVERHEAD THREADS IN A HIGH-CONCURRENCY SYSTEM

This application claims the benefit of U.S. Provisional Application No. 60/195,732, filed Apr. 7, 2000.

BACKGROUND OF THE INVENTION

1. Field of the Invention

This invention relates to low-overhead threads in a high-concurrency system, such as for a networked cache or file server.

2. Related Art

In many computing systems, it is desirable in certain circumstances to be able to process, relatively simultaneously (such as in parallel), a relatively large number of similar tasks. For example, the same or similar tasks could be performed by a server device (such as a file server) in response to requests by a number of client devices. One such circumstance is in a networked cache or file server, which maintains and processes a relatively large number of sequences of requests (sometimes called "connections"), so as to couple an information requester (such as a web client) to one or more information providers, which are also coupled to the same internetworking system. One known method in which an individual processor or a multiprocessor system is able to maintain a high degree of concurrency is for the system to process each connection using a separate processing thread. A "thread" is a locus of control within a process, indicating a spot within that process that the processor is then currently executing. In general, a thread has a relatively small amount of state information associated therewith, generally consisting only of a calling stack and a relatively small number of local variables.

High concurrency systems, such as networked caches and file servers used in an internetworking system, must generally maintain a large number of threads. Each information requester has its own separate connection for which the network cache or file server must maintain some amount of state information. Each such separate connection requires only a small amount of state information, such as approximately 100 to 200 bytes of information. Since there are in many cases a relatively large number of individual connections, it would be desirable to be able to maintain state information about each such connection using only a relatively minimal amount of memory and processor overhead, while simultaneously maintaining both relatively reliable programmability and relatively high processing speed.

One problem with known systems is that allocation of state information for individual threads does not generally scale well. One of the problems with relatively large numbers of individual threads is that of allocating memory space for a calling stack for each one of those threads. In a first set of known systems, stack space for individual threads is allocated statically; this has the drawback that relatively large numbers of threads require a relatively large amount of memory to maintain all such stack spaces. Although the amount of stack space statically allocated for each individual thread can be reduced significantly, this has the drawback that operations that can be performed by each individual thread are similarly significantly restricted. In a second set of known systems, stack space for individual threads is allocated dynamically; this has the drawback that the minimum size for dynamic allocation of memory is generally measured in kilobytes, resulting in substantial unnecessary memory overhead. Although virtual memory can be used to store and retrieve stack space for individual threads in smaller increments, this has the drawback that compression and decompression of stack space for individual threads imposes substantial unnecessary processor overhead. In a third set of known systems, such as those using the Java programming language, dynamic memory allocation is used to store and retrieve stack space for individual threads; this has the drawback that each procedure call within each thread imposes substantial unnecessary processor overhead.

An additional problem is introduced by the particular use made of multi-threading by the WAFL file system (as described in the Incorporated Disclosures). In the WAFL file system, the C language "setjmp" and "longjmp" routines are combined with message passing among threads so as to support high concurrency using threads. In particular, the requester of an initial file request to the WAFL file system packages the request in a message, which the WAFL file system processes using ordinary procedural program code, so long as data is available for processing the request and the thread need not have its execution suspended. If the thread is suspended for any reason (such as if a resource is not available,) the WAFL file system: (1) requests the needed resource, (2) 1.3 queues the message for signaling when the resource is available, and (3) calls the C routing "longjmp" to return to the origin of the routine for processing the message. Thus, the WAFL file system restarts processing the entire message from the very beginning until all needed resources are available and processing can complete without suspension. While this use of multithreading by the WAFL file system has the advantage that programmers do not need to encode program state when a routine is suspended, it has the disadvantage, when combined with multithreading, that all necessary data structures (to process any arbitrary message) must be collected before the entire message can be processed. In an internetworking environment, collecting all such structures can be difficult and subject to error.

Accordingly, it would be advantageous to provide a technique for creating and using relatively low-overhead threads in a high-concurrency system, such as for a networked cache or file server, that is not subject to drawbacks of the known art.

SUMMARY OF THE INVENTION

The invention provides a method and system for providing the functionality of dynamically-allocated threads in a multithreaded system in which the operating system provides only statically-allocated threads. With this functionality, a relatively large number of threads can be maintained without a relatively large amount of overhead (either in memory or processor time), and it remains possible to produce program code without undue complexity.

In a preferred embodiment, a plurality of dynamically-allocated threads are simulated using a single statically-allocated thread, but with state information regarding each dynamically-allocated thread maintained within the single statically-allocated thread. The single statically-allocated thread includes, for each procedure call that would otherwise introduce a new dynamically-allocated thread, a memory block including: (1) a relatively small procedure call stack for the new dynamically-allocated thread, and (2) a relatively small collection of local variables and other state information for the new dynamically-allocated thread. When using multithreading in the WAFL file system, high concurrency among threads can be maintained without any particular requirement that the program code maintain a substantial amount of state information regarding each dynamically-allocated thread. Each routine in the WAFL file system that expects to be suspended or interrupted need maintain only a collection of entry points into which the routine is re-entered when the suspension or interruption is completed. A feature of the C language preprocessor allows the programmer to generate each of these entry points without substantial additional programming work, with the aid of one or more programming macros.

The invention provides an enabling technology for a wide variety of applications for multithreaded systems so as to obtain substantial advantages and capabilities that are novel and non-obvious in view of the known art. Examples described below primarily relate to networked caches and file servers, but the invention is broadly applicable to many different types of automated software systems.

BRIEF DESCRIPTION OF THE DRAWINGS

FIG. 2 shows a process flow diagram of a system for providing function ality of low-overhead threads in a high-concurrency system, such as for a networked cache or file server.

DETAILED DESCRIPTION OF THE PREFERRED EMBODIMENT

Figure 1:
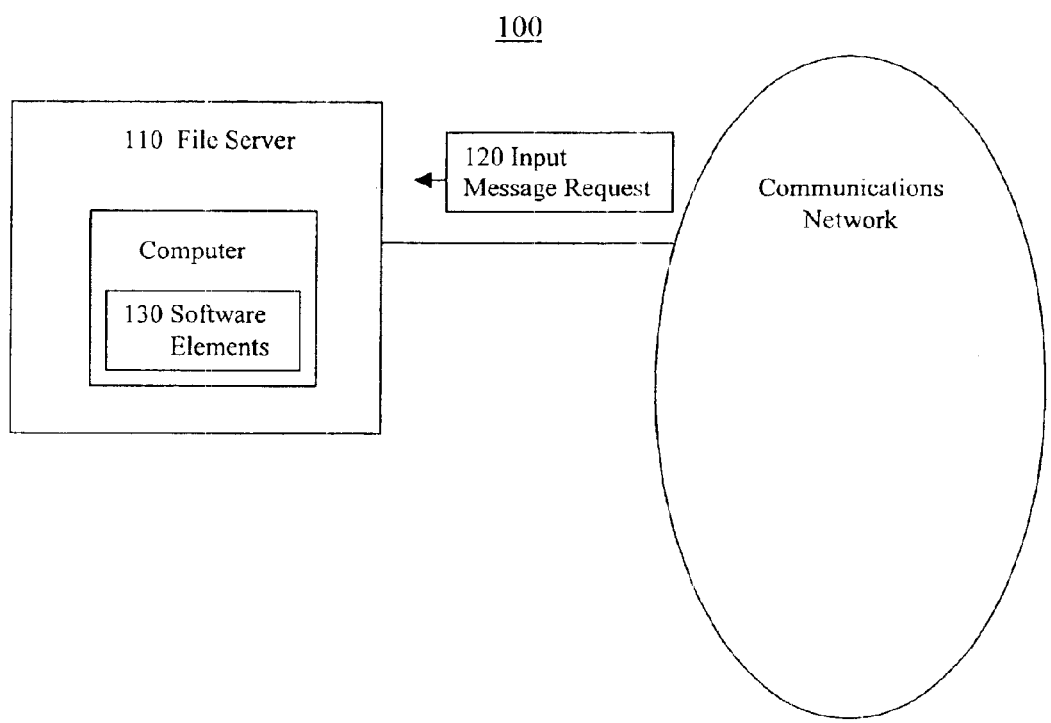
FIG. 1 shows a block diagram of a system for providing functionality of low-overhead threads in a high-concurrency system, such as for a networked cache or file server.

In the following description, a preferred embodiment of the invention is de scribed with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Lexicography

The following terms refer or relate to aspects of the invention as described below. The descriptions of general meanings of these terms are not intended to be limit ing, only illustrative.

client and server—In general, these terms refer to a relationship between two devices, particularly to their relationship as client and server, not necessarily to any particular physical devices.

For example, but without limitation, a particular client device in a first relationship with a first server device, can serve as a server device in a second relationship with a second client device. In a preferred embodiment, there are generally a relatively small number of server devices servicing a relatively larger number of client devices.

client device and server device—In general, these terms refer to devices taking on the role of a client device or a server device in a client-server relationship (such as an HTTP web client and web server). There is no particular requirement that any client devices or server devices must be individual physical devices. They can each be a single device, a set of cooperating devices, a portion of a device, or some combination thereof.

For example, but without limitation, the client device and the server device in a client-server relation can actually be the same physical device, with a first set of software elements serving to perform client functions and a second set of software elements serving to perform server functions As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

FIG. 1 shows a block diagram of a system for providing functionality of low-overhead threads in a high-concurrency system, such as for a networked cache or file server.

A system 100 includes a networked cache or file server (or other device) 110, a sequence of input request messages 120, and a set of software elements 130.

The networked cache or file server (or other device) 110 includes a computer having a processor, program and data memory, mass storage, a presentation element, and an input element, and is coupled to a communication network. As used herein, the term "computer" is intended in its broadest sense, and includes any device having a programmable processor or otherwise falling within the generalized Turing machine paradigm. The mass storage can include any device for storing relatively large amounts of information, such as magnetic disks or tapes, optical devices, magneto-optical devices, or other types of mass storage.

The input request messages 120 include a set of messages requesting the networked cache or file server 110 to perform actions in response thereto. In a preferred embodiment, the actions to be performed by the networked cache or file server 110 will involve access to the mass storage or to the communication network. In a preferred embodiment, the input request messages 120 are formatted in a known request protocol, such as NFS, CIFS, HTTP (or variants thereof), but there is no particular requirement for the input request messages 120 to use these known request protocols or any other known request protocols. In a preferred embodiment, the networked cache or file server 110 responds to the input request messages 120 with both: (1) a condign set of responsive actions involving the mass storage or the vacation network, and (2) a condign response to the input request messages 120, the response to the input request messages 120 preferably taking the form of a set of response messages (not shown.)

The software elements 130 include a set of programmed routines to be per formed by the networked cache or file server 110, using the functionality of low-overhead threads and high-concurrency as described herein. Although particular program code is described herein with regard to the programmed routines, there is no particular reason that the software elements 130 must use the specific program code described herein, or any other specific program code.

Method of Operation

FIG. 2 shows a process flow diagram of a system for providing function ality of low-overhead threads in a high-concurrency system, such as for a networked cache or file server.

A method 200 includes a set of flow points and a set of steps. The system 100 performs the method 200. Although the method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

At a flow point 210, the networked cache or file server 110 is ready to receive and respond to the input request messages 120.

At a step 211, the networked cache or file server 110 receives an input re quest message 120, and forwards that input request message 120 to an appropriate soft ware element 130 for processing. In a preferred embodiment, the step 211 includes per forming a calling sequence for the software element 130, including possibly creating a simulated dynamically allocated thread (that is, a thread simulated so as to appear to be dynamically-allocated, hereinafter sometimes called a "simulated thread" or an "S-thread") within which the software element 130 is performed. Thus, the software element 130 can be created using program code that assumes that the software element 130 is per formed by a separate thread and does not demand relatively excessive resources (either memory or processor time.)

As part of step 211, the networked cache or file server 110 allocates a procedure call block 131 and a local variable block 132, for use by the simulated dynamically-allocated thread performed by the software element 130. The procedure call block 131 includes a set of input variables for input to the software element 130, a set of output variables for output from the software element 130, and such other stack element as is known in the art of calling stacks for procedure calls. The local variable block 132 includes a set of locations in which to store local variables for the software element 130.

As part of step 211, the networked cache or file server 110 determines whether the software element 130 is a subroutine of a previously called software element 130 in the same simulated thread. If so, the networked cache or file server 110 indicates that fact in a block header 133 for the software element 130, so as to point back to the particular software element 130 that was the parent (calling) software element 130. If not, the networked cache or file server 110 does not indicate that fact in the block call or block header for the software element 130.

As part of this step, the networked cache or file server 110 determines whether the software element 130 is to be performed by a new simulated thread. If so, the networked cache or file server 110 adds the new thread block 134 to a linked list 135 of thread blocks 134 to be performed in turn according to a scheduler. In a preferred embodiment, the scheduler simply performs each simulated thread corresponding to the next thread block 134 in round-robin sequence, so that each simulated thread corresponding to a thread block 134 is performed in its turn, until it is suspended or completes. However, in alternative embodiments, the scheduler may select simulated threads in other than a round-robin sequence, so as to achieve a desired measure of quality of service, or other administrative goals.

At a step 212, the networked cache or file server 110 chooses the simulated thread for execution. The simulated thread, with appropriate data completed for the procedure call block 131 and local variable block 132, is performed in its turn, until it is suspended or completes. If the simulated thread is capable of completing its operation without being suspended or interrupted, the scheduler selects the next thread block 134 in the linked list of thread blocks 134 to be performed in turn.

After this step, the method 200 has performed one round of receiving and responding to input request messages 120, and is ready to perform another such round so as to continuously receive and respond to input request messages 120.

The method 200 is performed one or more times starting from the flow point 210 and continuing therefrom. In a preferred embodiment, the networked cache or file server 10 repeatedly performs the method 200, starting from the flow point 210 and continuing therefrom, so as to receive and respond to input request messages 120 periodically and continuously.

Program Structures

A set of program structures in a system for providing functionality of low-overhead threads in a high-concurrency system, such as for a networked cache or file server, includes one or more of, or some combination of, the following:

A set of program structures for declaring and creating a dynamically-allocated thread in a system in which threads are usually statically-allocated;

```
typedef struct {
    // local variables
    int arg;    // an example, not necessary
} function_msg;
```

In the program structure above, the definition for the structure type "function_msg" includes: (1) the local variables for the dynamically-allocated thread, (2) any input arguments to the dynamically-allocated thread, in this case just the one variable "arg", and (3) any output arguments from the dynamically-allocated thread, in this case none.

A set of program structures for denoting program code entry-points for a simulated thread;

```
static void
    function_sthread(sthread_msg *m)
    {
        function_msg * const msg = m->data;
        STHREAD_START_BLOCK(m);
        // executable C code
        STHREAD_RESTART_POINT (m);         // an example blocking point
        // executable C code
        STHREAD_COND_WAIT (m, cond (m));   // encapsulated blocking point
        // executable C code
        STHREAD_END_BLOCK;
        free (msg);
    }
```

The program structure above includes, in its definition for the function "function_sthread", an initial program statement obtaining access to the local variables for the simulated thread. This is the statement referring to "m->data".

The program structure above includes a definition for a start-point for the simulated thread. This is the statement "STHREAD_START_BLOCK (m)", which makes use of a macro defined for the name "STHREAD_START_BLOCK".

The program structure above includes a definition for a restart-point for the simulated thread. This is the statement "STHREAD_RESTART_POINT (m)", which makes use of a macro defined for the name "STHREAD_RESTART_POINT".

The program structure above includes a definition for a conditional-wait point (a possible suspension of the simulated thread) for the simulated thread. This is the statement "STHREAD_COND_WAIT(m, cond(m))", which makes use of a macro defined for the name "STHREAD_COND_WAIT".

The program structure above includes, in its definition for the function "function_sthread", a closing program statement for ending the simulated thread. This is the statement "STHREAD_END_BLOCK", which makes use of a macro defined for the name "STHREAD_END_BLOCK". The program structure above also includes a statement for freeing any data structures used by the simulated thread. This is the statement "free(msg)".

The macro definitions for "STHREAD_START_BLOCK", "STHREAD_RESTART_POINT", and "STHREAD_END_BLOCK" collectively form a C language "case" statement.

The macro "STHREAD_START_BLOCK" includes the preamble to the "case" statement:

```
#define STHREAD_START_BLOCK (m) switch (m -> line) { case 0:
```

The macro "STHREAD_RESTART_POINT" includes an intermediate restart point in the "case" statement:

```
#define STHREAD_RESTART_POINT(m) case __LINE__: m -> line = __LINE__
```

The restart point uses the C preprocessor to generate tags that the switch statement uses as branch points. The C macro __LINE__ substitutes the line number of the file being processed, so a series of restart points generates a series of unique cases within the switch. Setting m->line to the case just entered means that if the procedure is re-entered the switch statement will branch to the restart point and continue.

The macro "STHREAD_START_BLOCK" includes the close of the "case" statement:

```
#define STHREAD_END_BLOCK }
```

Thus, the C preprocessor generates a "case" statement in response to use of these macros, which allows the programmer to easily specify each of the proper restart points of the routine.

A set of program structures for suspending and restarting simulated threads;

```
#define   STHREAD_COND_WAIT(m,  c)    \
    STHREAD_RESTART_POINT(m); \
    {\ if (c) \
        sthread_suspend( ); \
    }
```

At an individual restart point, the programmer can use the macro "STHREAD_COND_WAIT" to conditionally either wait for an operation to complete, or to suspend and restart the simulated thread while waiting for resources for the operation to complete.

A set of program structures for initiating simulated threads;

The macro "STHREAD_INIT" allocates memory for the simulated thread, sets the C preprocessor value __LINE__ to zero, sets the value of "data" to the private stack area of the particular simulated thread, and sets a value for "handler" to a function passed to the macro as an argument.

```
#define STHREAD_INIT(m, msg, handler)\m = malloc(sizeof(*m)); \
msg = zalloc(sizeof(*msg)); \m -> line = 0; \m -> data = msg;\m -> handler = handler
```

A set of program structures for actually performing the simulated thread;

```
void
    function(int arg)
    {
        function_msg *msg;
        sthread_msg *m;
        STHREAD_INIT(m, msg, function_sthread);
        msg->arg = arg;
        sthread_run(m);
    }
```

The program structure above includes, in its definition for the function "function", program code for creating the data blocks for the simulated thread, and for placing data in those data blocks. These are the statements "STHREAD_INIT(m, msg, function_sthread)" and "msg->arg=arg", which make use of a macro defined for the name "STHREAD_INIT".

A set of program structures for scheduling performance of simulated threads;

```
switch (m->line){   // a field in sthread_msg
case 0:
    // executable C code
    STHREAD_RESTART_POINT(m);
    // executable C code
    STHREAD_RESTART_POINT(m);
    // executable C code
}
```

The program structure above includes, in its definition for the function "function", program code for creating the data blocks for the simulated thread, and for placing data in those data blocks. These are the statements "STHREAD_INIT(m, msg, function_sthread)" and "msg->arg=arg", which make use of a macro defined for the name "STHREAD_INIT".

A set of program structures for suspending and resuming performance of simulated threads.

```
typedef struct sthread_msg {
    int line;
    void *data;
    void (*handler)(sthread_msg *);
}
jmp_buf sthread_env;
void
    sthread_run(sthread_msg *m)
    {
        if (!setjmp(sthread_env)) {
            m->handler(m);
            free(m);
        }
    }
void
    sthread_suspend( )
    {
```

```
            longjmp(sthread_env, 0);
        }
    sthread_msg *suspended_sthread;
        int ready;
        int
        cond(sthread_msg *m)
        {
            if (ready)

return 1;
        suspended_sthread = m;
        sthread_suspend( );
    }
    int
    set_cond( )
    {
        ready = 1;
        if (suspended_sthread){
            sthread_msg *m = suspended_sthread;
            suspended_sthread = 0;
            sthread_run(m);
        }
    }
    // cond( ) changed
    sthread_run(suspended_sthread);
``` and

A set of program structures for performing simulated threads in conjunction with the WAFL file system, as shown above.

Generality of the Invention

The invention has general applicability to various fields of use, not necessarily related to the services described above. For example, these fields of use can include devices other than file servers.

Other and further applications of the invention in its most general form, will be clear to those skilled in the art after perusal of this application, and are within the scope and spirit of the invention.

Technical Appendix

The technical appendix enclosed with this application is hereby incorporated by reference as if fully set forth herein, and forms a part of the disclosure of the invention and its preferred embodiments.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method including simulating a plurality of dynamically-allocated threads using a single statically-allocated thread; and maintaining state information used by each dynamically-allocated thread in variables maintained by said statically-allocated thread;

wherein said statically-allocated thread simulates said plurality of dynamically-allocated threads by using a scheduler to call thread blocks for said plurality of dynamically-allocated threads; and wherein said thread blocks are stored in a linked list maintained by said statically-allocated thread.

2. A method as in claim 1, further including maintaining, for a routine capable of being suspended or interrupted, a set of entry points into which said routine is capable of being re-entered after said suspension or interruption.

3. A method as in claim 1, further including generating said set of entry points in response to one or more programming macros.

4. A method as in claim 1, further including maintaining high concurrency among threads without maintaining a substantial amount of state information regarding simulated threads.

5. A method as in claim 4, wherein an amount of state information that is maintained is less than an amount of state information that would be necessary for plural actual dynamically-allocated threads.

6. A method as in claim 1, wherein said state information includes a relatively small procedure call stack for the simulated threads.

7. A method as in claim 6, wherein said relatively small procedure call stack is smaller than a procedure call stack that would be necessary for plural actual dynamically-allocated threads.

8. A method as in claim 1, wherein said state information includes a relatively small collection of local variables and other state information for the simulated threads.

9. A method as in claim 1, wherein said plurality of dynamically-allocated threads are simulated using said statically-allocated thread under an operating system that is incapable of executing plural actual dynamically-allocated threads.

10. A method as in claim 1, wherein said thread blocks in said linked list are called in turn by said scheduler.

11. Apparatus including a file server system having a single statically-allocated thread including a plurality of simulated dynamically-allocated threads, said statically-allocated thread maintaining variables that maintain state information used by each of said simulated dynamically-allocated threads;

wherein said statically-allocated thread simulates said plurality of dynamically-allocated threads by using a scheduler to call thread blocks for said plurality of dynamically-allocated threads; and wherein said thread blocks are stored in a linked list maintained by said statically-allocated thread.

12. Apparatus as in claim 11, further including a routine capable of being suspended or interrupted, said routing having a set of entry points into which said routine is capable of being re-entered after said suspension or interruption.

13. Apparatus as in claim 12, wherein said set of entry points are responsive to one or more programming macros.

14. Apparatus as in claim 11, wherein said state information includes a relatively small procedure call stack for the simulated threads.

15. Apparatus as in claim 14, wherein said relatively small procedure call stack is smaller than a procedure call stack that would be necessary for plural actual dynamically-allocated threads.

16. Apparatus as in claim 11, wherein said state information includes a relatively small collection of local variables and other state information for the simulated threads.

17. Apparatus as in claim 16, wherein said relatively small collection of local variables and other state information is smaller than a collection of local variables and other state information that would be necessary for plural actual dynamically-allocated threads.

18. Apparatus as in claim 11, wherein said file server system is incapable of executing plural actual dynamically-allocated threads.

19. Apparatus as in claim 11, wherein said thread blocks in said linked list are called in turn by said scheduler.

20. A method of implementing a plurality of simulated dynamically-allocated threads using a single statically-allocated thread, comprising:

using a scheduler implemented by said single statically-allocated thread to call thread blocks for said plurality of simulated dynamically-allocated threads; and maintaining state information used by each of said plurality of simulated dynamically-allocated threads in variables maintained by said statically-allocated thread;

wherein said thread blocks are stored in a linked list maintained by said statically-allocated thread.

21. A method as in claim 20, wherein said thread blocks in said linked list are called in turn by said scheduler.

22. Apparatus including a server that implements a plurality of simulated dynamically-allocated threads using a single statically-allocated thread, comprising:

a processor that executes a scheduler implemented by said single statically-allocated thread to call thread blocks for said plurality of simulated dynamically-allocated threads; and memory that stores state information used by each of said plurality of simulated dynamically-allocated threads in variables maintained by said statically-allocated thread;

wherein said thread blocks are stored in a linked list maintained in said memory by said statically-allocated thread.

23. Apparatus as in claim 22, wherein said thread blocks in said linked list are called in turn by said scheduler.

* * * * *